Aug. 30, 1960

H. J. HARTZ 2,950,729

CONTROLLER

Filed March 25, 1958

INVENTOR.
HARRY J. HARTZ
BY
Arthur H. Swanson
ATTORNEY.

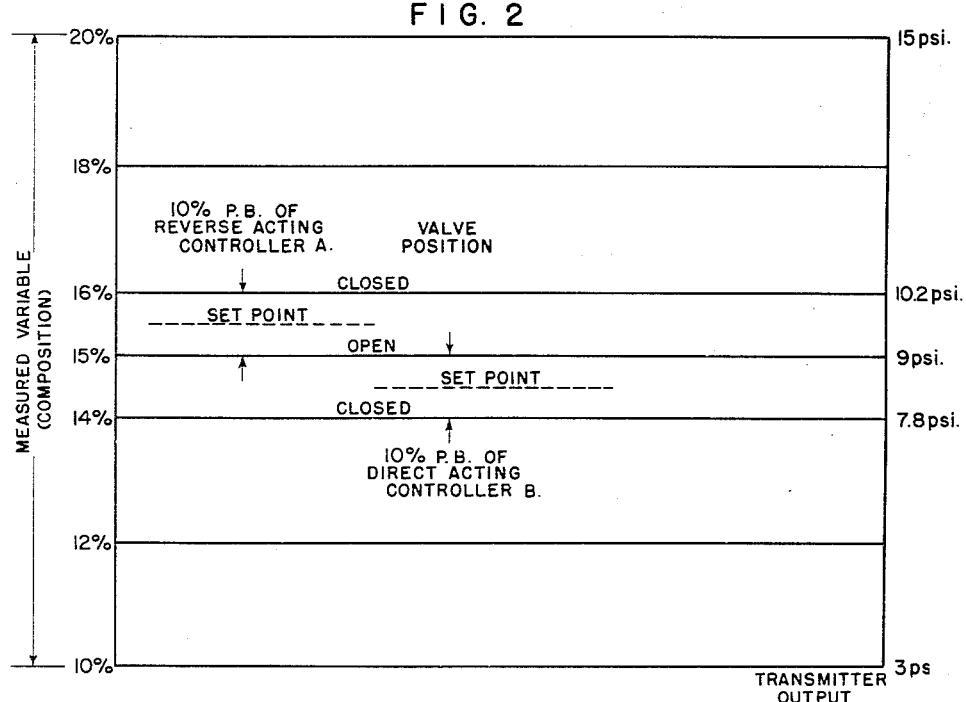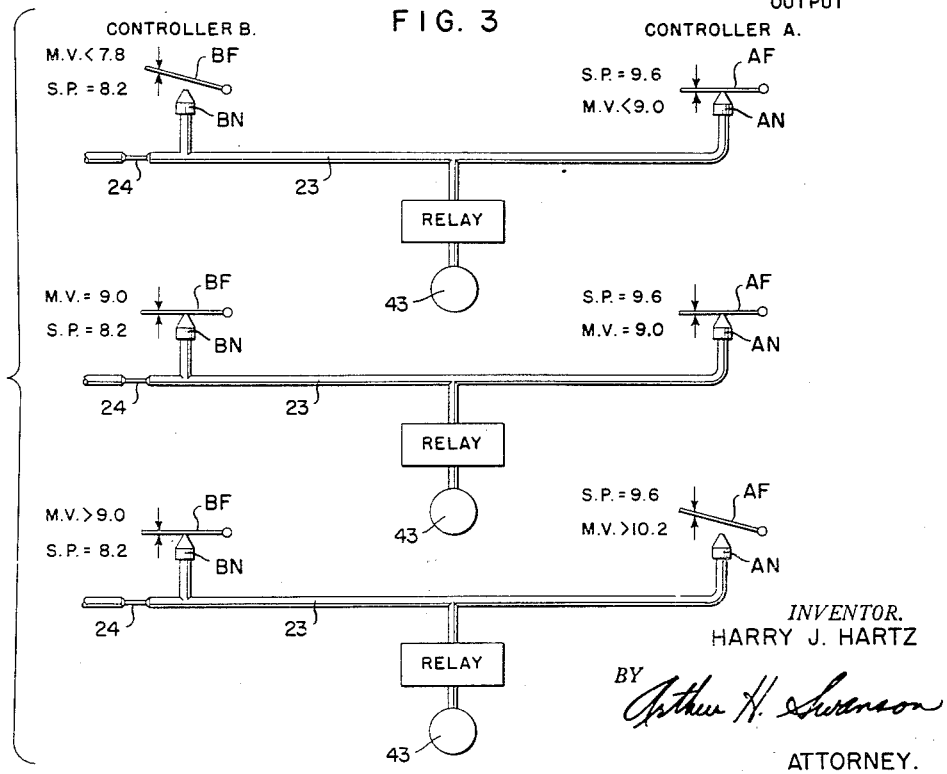

United States Patent Office 2,950,729
Patented Aug. 30, 1960

2,950,729

CONTROLLER

Harry J. Hartz, Philadelphia, Pa., assignor to Minneapolis-Honeywell Regulator Company, Minneapolis, Minn., a corporation of Delaware Filed Mar. 25, 1958, Ser. No. 723,863

8 Claims. (Cl. 137—85)

This invention relates to a control system or servo mechanism comprising essentially: a measuring element, a pair of controllers, and a final control element.

The measuring element comprises means for sensing the variations in any one of a number of variables including: temperature, pressure, humidity, dewpoint, flow, liquid level, chemical or electrochemical composition, moisture, speed, motion, etc. The measuring instrument is connected to each of the controllers (to be described hereinafter) by means of a mechanical linkage or an electric or pneumatic transmission system.

The controller proper includes a power-amplifying relay which may be a means for varying an electric current, an electric voltage, or the pressure of compressed air. Such a controller also includes a set point adjustment or means for providing a position of the controller representing that value of the controlled variable which it is desired that the controller maintain. The input to the controller is formed by the output of the linkage or transmission system from the measuring element. This input or measured variable element of the controller operates so as to cause the controller to actuate the relay in response to any movement of the controller input, due to a variation in the measured variable away from the set point, which has been selected by the set point mechanism.

The final control element comprises a motor, connected to the electric or air-pressure-amplifying relay, and a final control element, such as a valve, operated by the motor and controlling the supply of a controlled variable to the process under control.

The final control element has a range of movement. Variations in the measured variable cause the final control element to traverse this range of movement. The range of values of the measured variable which corresponds to the full operating range of the final control element is known as the proportional band or throttling range.

It is an object of this invention to provide means whereby this proportional band may be adjusted from a very wide band to a very narrow one.

It is a further object of this invention to provide means whereby the proportional band may be selected at any point over the range of movement over the final control element.

It is yet a further object of this invention to provide a control system or servomechanism in which a single power-amplifying relay is itself controlled both by a direct-acting controller and a reverse-acting controller.

A better understanding of the present invention may be had from the accompanying drawings and descriptive matter in which is illustrated and described a preferred embodiment of the invention.

In the drawings:

Fig. 2 is a diagram useful in explaining this invention;

Fig. 3 is also a diagram useful in explaining this invention.

Figure 1:
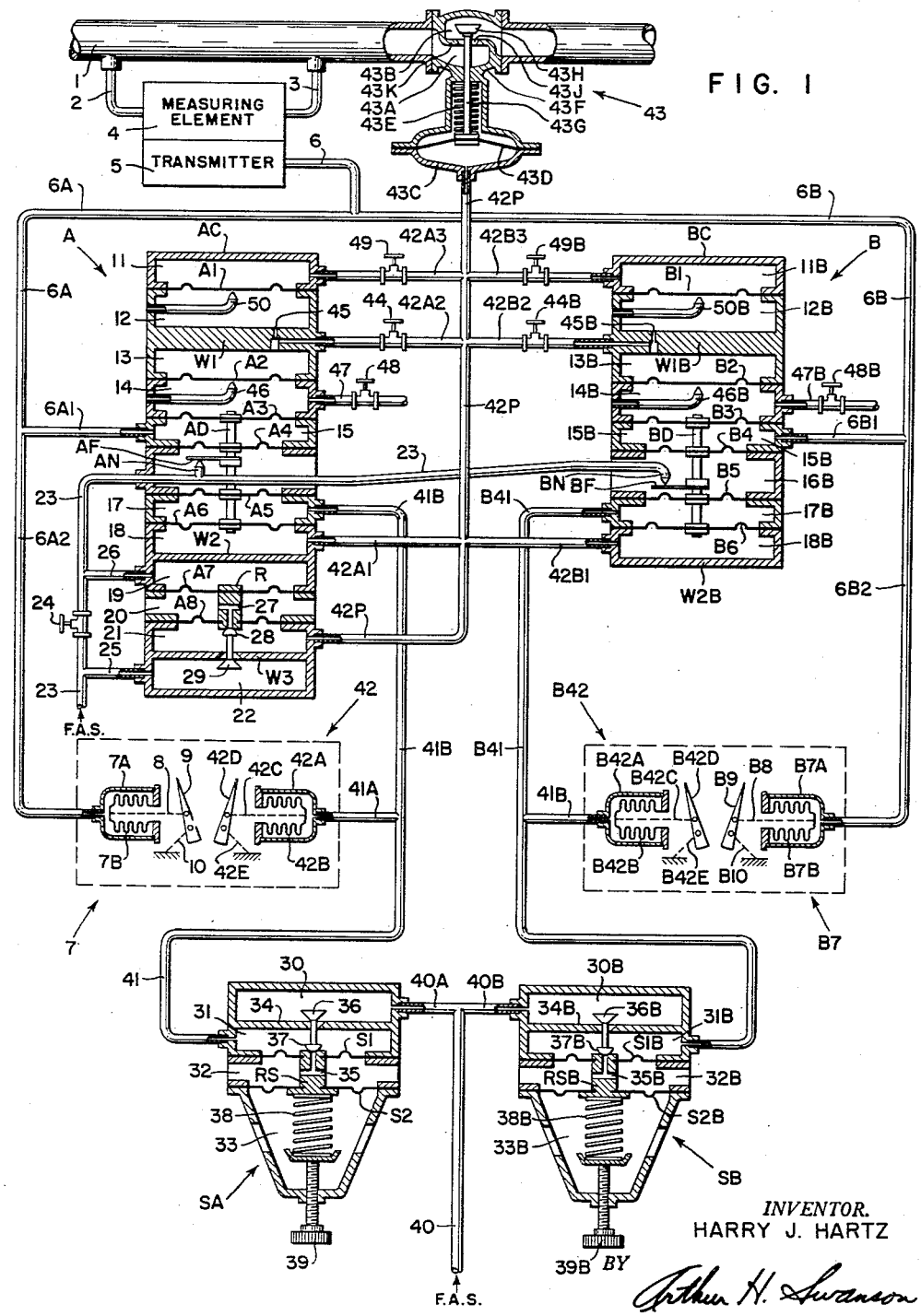
Fig. 1 is a diagrammatic or schematic showing of one embodiment of this invention.

The invention is disclosed as applied to controlling the quality of the product of the industrial process under control.

Fig. 1 shows a pipe 1 through which flows the fluid, whose quality is to be controlled. Bypass pipes 2 and 3 conduct a portion of the fluid flowing through pipe 1 through a measuring element 4.

Measuring element 4 may comprise an element commercially known as "Plant Stream Analyzer" manufactured by Process Controls, Division of Baird Associates, Inc., 11 University Road, Cambridge 38, Massachusetts. Measuring element 4 operates by applying infra red rays to the fluid flowing through bypass pipes 2 and 3. The composition of the fluid causes the measuring element 4 to operate the transmitter 5.

Transmitter 5 may well be a self-balancing potentiometer mechanism having an output in the form of a variable air pressure. Such a mechanism is shown in U.S. Patent 2,423,540, patented July 8, 1947, to Walter P. Wills.

Transmitter 5, whose output comprises a variable air pressure, has an output conduit 6 which divides into two branches 6A and 6B. Branch 6A also divides into two branches 6A1 and 6A2.

Branch 6A2 communicates with a first measured-variable indicator or recorder comprising a pneumatic receiver, generally indicated at 7, having a rigid casing 7A and a flexible wall each as bellows 7B. Bellows 7B has a mechanical connection 8 with a pointer 9, which is pivoted on a stationary pivot 10, so as to be rotated thereabout by variations in the air pressure in receiver 7. If desired, pointer 9 may have a recording pen (not shown) on its tip cooperating with a chart driven at a uniform speed to make a record thereon.

Branch conduit 6A1 communicates with a receiver 15 in the form of a chamber in a first, reverse-acting controller A of the stack type. Controller A is called reverse-acting because an increase in the pressure in the measured variable chamber 15 causes a decrease in the pressure in the motor chamber 19 and, consequently, a decrease in the pressure put out by relay chamber 21. Controller A comprises a rigid casing AC divided into a plurality of chambers 11, 12, 13, 14, 15, 16, 17, and 18 by means of flexible diaphragms A1, A2, A3, A4, A5 and A6 or by rigid walls W1 and W2. Diaphragms A3, A4, A5 and A6 are connected together by a rigid rod AD located in the center or axis of the controller stack. Diaphragms A1, A2, A3 and A6 apply pressure of the air in the chambers 11, 13, 15, 17 and 18, respectively. Consequently these diaphragms are large relative to the diaphragms A4 and A5, which are merely sealing diaphragms and, consequently, are relatively small. Rod AD causes flapper AF to move toward or away from stationary nozzle AN. Flapper AF and nozzle AN constitute a power-controlling means. A supply of filtered air under pressure (F.A.S.) is connected by means of pipe 23 and restriction 24 with nozzle AN.

Controller A actuates a power-amplifying relay comprising a branch conduit 25 communicating directly with supply F.A.S., with pipe 23 and with inlet chamber 22. Pipe 23, on the outlet side of rectriction 24, communicates by means of branch pipe 26 with chamber 19. Chamber 19 forms the motor or operating chamber of the relay. Diaphragms A7 and A8 are connected together by a rigid rod R which has a conduit 27 of T-shape therein. An inlet valve 29 is located in a port in wall W3 and is rigidly connected to an outlet valve 28 which cooperates with the lower end of the exhaust conduit 27.

The operation of the relay, which constitutes a power-amplifying means, is as follows. When the relay is in its normal or balanced position the inlet valve 29 and the outlet valve 28 are both closed. The pressure in chamber 21 is greater than the pressure in chamber 19 but, since the diaphragm A8 is smaller than the diaphragm A7, the relay valves 28 and 29 remain stationary.

If the pressure in chamber 19 varies, due to the movement of flapper AF relative to nozzle AN, diaphragm A7 moves so as to open either inlet valve 29 or exhaust valve 28. If inlet valve 29 opens, air is admitted from chamber 22 to chamber 21. If outlet valve 28 opens, air is exhausted from chamber 21 through outlet conduit 27 and chamber 20, which is open to atmosphere.

The first set-point-adjusting means, which adjust the set point of controller A, comprise a manually operable air-pressure transmitter SA. Transmitter SA comprises a rigid casing divided into chambers 30, 31, 32, and 33 by rigid wall 34 and flexible diaphragms S1 and S2. Air is led from a source of air under pressure (F.A.S.) by means of pipe 40 and branch pipe 40A to chamber 30. Diaphragms S1 and S2 are connected together by a rigid rod RS containing an inverted T-shaped passage 35 through it. Communication between inlet chamber 30 and controlled-air-pressure chamber 31 is governed by inlet valve 36. Communication between controlled-air-pressure chamber 31 and outlet chamber 32 (which is open to atmosphere) is controlled by exhaust valve 37. A spring 38 bears, at one end, on rod RS and bears, at its other end, on one end of an adjustable handle 39, which is screw threaded, or otherwise adjustably secured, in the rigid casing of the transmitter SA.

The operation of transmitter SA is as follows. When the transmitter is in its normal or balanced condition, the pressure of the air in chamber 31 balances the pressure of the spring 38. If it is desired to vary the pressure of the air in chamber 31, handle 39 is adjusted so that the tension of spring 38 is varied. This causes inlet valve 36 or exhaust valve 37 to open and thereby admits or exhausts air from the chamber 31 and, consequently, varies the pressure thereof.

Controlled-air-pressure chamber 31 communicates, by means of pipe 41, with a first set-point air-pressure indicator or recorder, generally indicated at 42. Indicator 42 comprises a rigid casing 42A and a movable wall or bellows 42B having mechanical connection 42C with a pointer 42D mounted on a stationary pivot 42E. If desired, pointer 42D may carry a recording pen (not shown) at its tip which records on a chart driven at uniform speed.

Pipe 41 also communicates, by means of branch pipe 41B, with chamber 17 of controller A. Chamber 17 is, therefore, known as the set-point chamber of the controller A.

The controlled-air-pressure or outlet chamber 21 of the relay communicates, by means of pipe 42P with the final control element, generally indicated at 43. Final control element 43 comprises a valve in pipe 1 having a valve casing 43F surrounding inlet chamber 43A and outlet chamber 43B separated by wall 43K having an orifice through it at one end of which orifice is formed frusto conical valve seat 43J.

An air-pressure-operated motor is comprised of a rigid casing 43C having one wall thereof formed by flexible diaphragm 43D. One end of spring 43E bears against valve casing 43F while the other end bears against diaphragm 43D and biases valve 43 to closed position. When the pressure of the air on diaphragm 43D is sufficient to overcome the bias of spring 43E, valve stem 43G lifts valve 43H off the stationary valve seat 43J. Valve 43 is, therefore, known as an air-to-open valve.

Outlet pipe 42P communicates by means of branch pipe 42A1 with chamber 18. The pressure of the air in chamber 18 opposes the pressure of the air in chamber 17. Chamber 18 is, therefore, the negative feedback chamber of controller A because the controller A is reverse-acting.

Outlet pipe 42P also communicates by means of branch pipe 42A2 with chambers 12 and 13 of controller A. An adjustable restriction 44 (such as a manually operable needle valve) is located in branch pipe 42A2 between outlet pipe 42 and chamber 13. A restriction 45 is located in the pipe between chambers 12 and 13. Diaphragm A2, which forms the flexible wall of chamber 13, controls the flow of air through stationary nozzle 46, which communicates with the atmosphere. Nozzle 46 is in chamber 14 to which air is supplied by means of an inlet pipe 47 having a restriction 48 therein and communicating with a supply of air under pressure. The pressure of the air in chambers 13 and 14 remains equal so that these chambers constitute a one-to-one relay. Since the pressure of the air in chamber 13 opposes the pressure of the air in chamber 15, which is the measured variable pressure chamber, chamber 13 is the positive feedback chamber of controller A because the controller A is reverse-acting.

Restrictions 44 and 45 and their cooperating chambers 12 and 13 form means for adjusting the proportional band or throttling range of a controller. This is done by manually adjusting the restriction 44 to vary its relative resistance to the flow of air through it. The proportional band of controller A is a function of the percentage of the air-pressure change put out by the relay chamber 21 applied to the positive feedback chamber 13. The greater the positive feedback pressure, the narrower will be the proportional band of controller A. When the proportional band restriction 44 is almost fully opened, the positive feed-back pressure is only slightly less than the output pressure in pipe 42. Consequently the proportional band is narrow.

When the proportional band restriction 44 is in an almost closed position, the positive feedback pressure is considerably less than the output pressure in pipe 42. The proportional band is consequently wide. When band restriction 44 is completely closed, the positive feedback pressure is only that determined by the reset action (as is hereinafter explained). The proportional band (the maximum for which the controller is designed) is 150%.

Outlet pipe 42P communicates, by means of branch pipe 42A3 containing reset restriction 49, with chamber 11 of controller A. Diaphragm A1 forms a flexible wall or chamber 11 and controls the flow of air through stationary nozzle 50 which communicates with the atmosphere and bleeds air from chamber 12.

The operation of controller A is as follows. Assume that the pressure in the measured variable pressure chamber 15 is equal to the pressure in the set point pressure chamber 17. Now assume that a change in the measured variable flowing in pipe 1 is sensed by measuring element 4 and transmitted by transmitter 5 to the measured variable chamber 15 of controller A. This causes the pressure in chamber 15 to vary from the pressure in set point chamber 17. This causes diaphragms A3 and A6 to move rod AD and thereby move flapper AF away from or toward nozzle AN, depending upon whether the pressure in measured variable pressure chamber 15 goes above or below the pressure in set point pressure chamber 17. Since an increase in pressure in measured variable chamber 15 causes a decrease in pressure in nozzle AN, controller A is of the reverse-acting type. The variation of the pressure in nozzle AN varies the pressure in pipe 23 and, consequently, the pressure in relay motor chamber 19. A variation in the pressure in chamber 19 moves rod R and opens either inlet valve 29 or exhaust valve 28 and, therefore, varies the pressures in outlet chamber 21 and in outlet pipe 42P connected thereto. This changes the output of controller A to the final control valve 43 so that the flow through pipe 1 is increased or decreased.

This change in the output pressure of the relay changes the pressure instantaneously in the negative feedback pressure chamber 18. At the same time, air discharges across proportional band restriction 44 into the positive feedback chamber 13. The magnitude of the pressure in the positive feedback chamber 13 is determined by the ratio of the resistances of the proportional band restriction 44 and the restriction 45, which may be fixed. The ratio of these resistances determines the ratio of the pressures in chambers 12 and 13 of the one-to-one relay.

A change in pressure in air in outlet pipe 42P also causes air to discharge through the reset restriction 49 into the chamber 11. A change in the air pressure in chamber 11 positions diaphragm A1 with respect to exhaust nozzle 50 until the pressure in chambers 11 and 12 are equal. The pressure bleed across the reset restriction 49 continues until the pressure in the positive feedback chamber is equal to the pressure in the negative feedback chamber. The corrective change is then sufficient to cause the controller A to balance at the new value determined by the pressure in the set point chamber.

The first measured variable indicator or recorder 7, the first set-point-adjusting means SA, and the first or reverse-acting controller A are each duplicated except that the controller B is direct-acting and not reverse-acting as is controller A.

The transmitter 5 communicates by means of pipes 6, 6B and 6B2 with the second measured-variable-indicator or recorder, generally indicated at B7. Indicator or recorder B7 comprises a rigid casing B7A having a flexible wall or bellows B7B which has a mechanical connection B8 with a pointer B9 pivoted on a stationary pivot B10 so as to be rotated by the changes in the pressure of the air applied to bellows B7B.

The second set-point-adjusting means, which adjust the set point of controller B, comprise a manually operable air-pressure transmitter SB. Transmitter SB comprises a rigid casing divided into chambers 30B, 31B, 32B, and 33B by rigid wall 34B and flexible diaphragms S1B and S2B. Air is led from a source of air under pressure (F.A.S.) by means of pipe 49 and branch pipe 49B to chamber 30B. Diaphragms S1B and S2B are connected together by a rigid rod RSB containing an inverted T-shaped passage 35B through it. Communication between inlet chamber 30B and controller-air-pressure chamber 31B is governed by inlet valve 36B. Communication between controlled-air-pressure chamber 31B and outlet chamber 32B is controlled by exhaust valve 37B. A spring 38B bears, at one end, on rod RSB, and bears, at its other end, on one end of an adjustable handle 39B which is screw threaded or otherwise adjustably secured in the rigid casing of the transmitter SB.

The operation of the transmitter SB is exactly the same as the operation of the transmitter SA.

Controlled-air-pressure chamber 31B communicates, by means of pipe B41 with a second set-point air-pressure indicator or recorder, generally indicated at B42. Indicator B42 comprises a rigid casing B42A and a movable wall or bellows B42B having a mechanical connection B42C with a pointer B42D mounted on a stationary pivot B42E so as to be rotated about the stationary pivot by changes of the pressure of the air applied to bellows B42B. If desired, pointer B42D may have a recording pen on its tip.

A second, direct-acting controller B comprises a rigid casing BC divided into a plurality of chambers 11B, 12B, 13B, 14B, 15B, 16B, 17B, and 18B by means of flexible diaphragms B1, B2, B3, B4, B5, and B6 or by rigid walls W1B and W2B. Diaphragms B3, B4, B5, and B6 are connected together by a rigid rod BD located in the center or axis of the controller stack. Rod BD causes a flapper BF to move toward or away from stationary nozzle BN. Flapper BF and nozzle BN constitute a power-varying means. A supply of filtered air under pressure (F.A.S.) is connected by means of pipe 23 and restriction 24 with nozzle BN.

Controller B also actuates the power-amplifying relay because nozzle BN communicates through pipe 23 and branch pipe 26 with the motor chamber 19 of the relay.

Transmitter 5 communicates by means of pipe 6, 6B, and 6B1 with chamber 15B. Chamber 15B is, consequently, the measured variable chamber of the controller B. Since an increase in pressure in chamber 15B causes flapper BF to move closer to nozzle BN, controller B is direct-acting. Outlet pipe 42P communicates by means of branch pipe 42B1 with chamber 18B. The operation of controller B is exactly the same as the operation of controller A except that controller B is direct-acting while controller A is reverse-acting.

Fig. 2 is a diagram showing the way the device of this invention operates. The vertical axis at the left of Fig. 2 is marked in a scale showing the percentage of the composition of the fluid flowing in pipe 1 and measured by measuring element 4. For example, this composition may vary from 10 percent to 20 percent. The vertical axis on the right of Fig. 2 is marked with the output pressure of transmitter 5. This pressure varies from 3 to 15 pounds per square inch (p.s.i.). The proportional band of controller A is adjusted to 10 percent by suitable adjustment of the restrictions 44 and 45. The proportional band of controller B is likewise adjusted to 10 percent by suitable adjustment of the restrictions 44B and 45B. The set point of controller B is adjusted to a value of 8.2 p.s.i. by suitable, manual adjustment of set-point-adjusting means SB. The set point of controller A is adjusted to a value of 9.6 p.s.i. by suitable adjustment of manually operable set-point-adjusting means SA.

Fig. 3 is a diagram showing in schematic form the restriction 24, the pipe 23, the relay, the nozzles AN and BN, the flappers AF and BF, and the final control element 43. Fig. 3 also shows the direction in which the measured-variable pressure (M.V.) and the set-point pressure (S.P.) actuate the flappers AF and BF, respectively, and the way in which the positions of the flappers AF and BF vary as the measured-variable pressure is less than ($<$), equal to ($=$), or more than ($>$) the set-point pressure (S.P.).

Refer to Figs. 2 and 3 and assume that the foregoing proportional band and set point adjustments have been made and that the process is ready to be started up. As the output pressure from transmitter 5 increases from its initial value of 3 p.s.i., the flapper BF remains away from nozzle BN because the pressure (M.V.) in measured-variable-pressure chamber 15B is less than 7.8 p.s.i. and consequently less than the set point pressure (S.P.) of 8.2 p.s.i. in chamber 17B. At the same time, flapper AF remains against nozzle AN because the measured-variable pressure (M.V.) in chamber 15, which tends to move flapper AF away from nozzle AN, is less than 9.0 p.s.i. and consequently less than the set-point pressure (S.P.) in chamber 17, which is 9.6 p.s.i. The final control element 43 is closed because the air pressure applied to diaphragm 43D is a minimum.

When the pressure in the measured-variable-pressure chambers 15 and 15B reaches 7.8 p.s.i., flapper BF starts to move towards nozzle BN, because the controller B has entered its proportional band. At the same time, flapper AF remains closed on nozzle AN, because controller A has not yet entered its proportional band.

When the pressure in the measured-variable chambers 15 and 15B reaches 9.0 p.s.i., flapper BF has closed against nozzle BN, because the upper limit of the proportional band of controller B has been reached. At the same time, flapper AF remains closed on nozzle AN because the pressure in measured-variable chamber 15 is 9.0 p.s.i., which is still below the set point pressure of 9.6 p.s.i. The final control element 43 is open because the air pressure applied to diaphragm 43D is a maximum.

However, the controller B is now leaving its proportional band while the controller A is entering its proportional band. Consequently, flapper BF remains closed against nozzle BN because the pressure in measured-variable chamber 15B remains greater than the pressure in the set-point chamber 17B, which is 8.2 p.s.i. Simultaneously, flapper AF starts to leave nozzle AN, because the pressure in measured-variable chamber 15 has risen into the proportional band of controller A. When the pressure in the measured-variable chambers 15 and 15B reaches 10.2 p.s.i., flapper BF remains closed against nozzle BN because the process-variable chamber pressure is greater than 8.2 p.s.i., which is the set-point pressure in chamber 17B. At the same time, flapper AF has moved to the extreme limit of its movement away from nozzle AN, because the controller A has reached the upper limit (10.2 p.s.i.) of its proportional band and, consequently, the pressure in the measured-variable chamber 15 is greater than the pressure (9.6 p.s.i.) in the set point chamber 17. The final control element 43 is closed because the air pressure applied to diaphragm 43D is a minimum.

The foregoing is merely one, illustrative example of the set-point pressures and the proportional bands which may be employed. The device of this invention is extremely flexible so that overlapping proportional bands, coinciding proportional bands, or widely spaced proportional bands may be employed, as desired.

What is claimed is:

1. A servomechanism, including, a measuring element sensing variations in a measured variable, a transmitter actuated by said measuring element, a pair of controllers each having means operable by said transmitter to vary a supply of power in the sense opposite to the sense in which said supply of power is varied by the other controller, means in each of said controllers manually operable to position the power-varying means in said controller at a set point representing that value of the measured variable which it is desired that the controller maintain, and a motor connected to each of said power-varying means to receive power therefrom and operable by the power supplied to said motor to actuate a final control element.

2. A servomechanism according to claim 1, including, one power-amplifying means connected to each of said power varying means to receive power therefrom and operable by the power supplied to said power-amplifying means to actuate said motor.

3. A servomechanism according to claim 1, including, means in each of said controllers manually operable to vary the width of the proportional band of said controller.

4. A servomechanism according to claim 1, including, an indicator connected to and actuated by said transmitter to indicate the instantaneous value of the measured variable.

5. A servomechanism according to claim 1, including, an indicator connected to and actuated by said set-point-positioning means to indicate the value of the measured variable which said controller is set to maintain.

6. In a network connecting a measuring element to an elastic-fluid-pressure-actuated motor moving a final control element, a measuring element sensing the variations in a measured variable, a pair of controllers each communicating with a supply of fluid under pressure and each connected to and operated by said measuring element over a range of instantaneous values of the measured variable constituting the proportional band of said controller to vary the pressure of said fluid in a sense opposite to that in which said measuring element operates the other of said controllers to vary the pressure of said fluid, each of said controllers being operated by measuring element when the instantaneous value of the measured variable is within the proportional band of said one controller, manually operable means to adjust the set point of each of said controllers and thereby to vary the position of the proportional band of each of said controllers relative to the proportional band of the other of said controllers, and an output conduit communicating with each of said controllers and conducting fluid at a pressure varied by that one of said controllers which is operative, the other of said controllers being inoperative.

7. An elastic-fluid-pressure-actuated control system, including, a measuring element sensing the variations in a measured variable, a first flapper-nozzle valve communicating with a supply of fluid under pressure and operable to vary the pressure of said fluid, a second flapper-nozzle valve communicating with a supply of fluid under pressure and operable to vary the pressure of said fluid, first means connecting said measuring element to said valves whereby said measuring element operates each of said valves in a sense opposite to that in which said measuring element operates the other of said valves, second means interacting with said first means and operating each of said valves in a sense opposite to that in which said second means operates the other of said valves to adjust the set points of said valves and to hold each of said valves closed when the instantaneous value of the measured variable is on one side of the proportional band of said one valve and to allow said one valve to be opened by said measuring element when the instantaneous value of the measured variable is within or on the other side of the proportional band of said one valve, and an output conduit conducting fluid at a pressure varied by that one of said flapper-nozzle valves which is open, the other of said flapper-nozzle valves being closed.

8. An elastic-fluid-pressure-actuated servomechanism, including, a measuring element sensing the variations in a measured variable, a first flapper-nozzle valve communicating with a supply of fluid under pressure and operable to vary the pressure of said fluid, a second flapper-nozzle valve communicating with a supply of fluid under pressure and operable to vary the pressure of said fluid, first means connecting said measuring element to said valves whereby said measuring element operates each of said valves in a sense opposite to that in which said measuring element operates the other of said valves, second means interacting with said first means to adjust said set point of said valves and to hold one of said valves closed when the instantaneous value of the measured variable is on one side of the proportional band of said one valve and to allow said one valve to be opened by said measuring element when the instantaneous value of the measured variable is within or on the other side of the proportional band of said one valve and vice versa, relay means communicating with a supply of fluid under pressure and operable by said first and said second flapper-nozzle valves to vary the pressure of said fluid, and an output conduit conducting fluid at a pressure varied by said relay means in response to that one of said flapper-nozzle valve which is opened, the other of said flapper-nozzle valves being closed.

References Cited in the file of this patent

UNITED STATES PATENTS

| 1,565,156 | Janson | Dec. 8, 1925 |
| 1,566,850 | Frenne | Dec. 22, 1925 |
| 2,809,714 | Sims | Oct. 15, 1957 |
| 2,834,363 | Pessen | May 13, 1958 |
| 2,864,399 | Hartz | Dec. 16, 1958 |